United States Patent
Natanzon et al.

(10) Patent No.: US 10,409,986 B1
(45) Date of Patent: Sep. 10, 2019

(54) RANSOMWARE DETECTION IN A CONTINUOUS DATA PROTECTION ENVIRONMENT

(71) Applicant: EMC IP Holding Company LLC, Hopkinton, MA (US)

(72) Inventors: Assaf Natanzon, Tel Aviv (IL); Sorin Faibish, Newton, MA (US); Philip Derbeko, Modi'in (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 369 days.

(21) Appl. No.: 15/275,768

(22) Filed: Sep. 26, 2016

(51) Int. Cl.
*G06F 21/55* (2013.01)
*G06F 12/14* (2006.01)
*G06F 21/56* (2013.01)

(52) U.S. Cl.
CPC ........ *G06F 21/554* (2013.01); *G06F 12/1408* (2013.01); *G06F 21/56* (2013.01); *G06F 2212/1052* (2013.01); *G06F 2212/402* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 * | 11/2010 | Ahal | G06F 17/30191 707/648 |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |

(Continued)

OTHER PUBLICATIONS

EMC Corporation, "EMC RECOVERPOINT/EX;" Applied Technology; White Paper; Apr. 2012; 17 Pages.

*Primary Examiner* — Sharif E Ullah
(74) *Attorney, Agent, or Firm* — Daly, Crowley Mofford & Durkee, LLP

(57) ABSTRACT

A computer program product, system, and method for generating coded fragments comprises intercepting, at a splitter, a write request from a host to storage, the write request comprising write data; sending the write request to a data protection appliance (DPA); calculating a probability of ransomware within the host; if the probability of ransomware is less than or equal to a first threshold, sending an acknowledgement (ACK) to the splitter; if the probability of ransomware is greater than a first threshold value and less than or equal to a second threshold value, creating a bookmark and sending an ACK to the splitter; and if the probability of ransomware is greater than the second threshold value, sending a delayed ACK to the splitter.

15 Claims, 5 Drawing Sheets

(56) References Cited

U.S. PATENT DOCUMENTS

| | | |
|---|---|---|
| 8,271,441 B1 | 9/2012 | Natanzon et al. |
| 8,271,447 B1 | 9/2012 | Natanzon et al. |
| 8,332,687 B1 * | 12/2012 | Natanzon ............ G06F 11/1471 709/202 |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 * | 8/2013 | Natanzon .......... G06F 17/30073 707/697 |
| 8,521,691 B1 | 8/2013 | Natanzon |
| 8,521,694 B1 | 8/2013 | Natanzon |
| 8,543,609 B1 * | 9/2013 | Natanzon ............ G06F 3/0605 707/791 |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 * | 3/2014 | Dotan ................ H04L 63/1408 709/224 |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 * | 11/2014 | Natanzon ............ G06F 11/2074 711/114 |
| 8,898,112 B1 | 11/2014 | Natanzon et al. |
| 8,898,409 B1 * | 11/2014 | Natanzon ................ G06F 11/00 711/162 |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 * | 7/2015 | Natanzon ............ G06F 11/1446 |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 * | 10/2015 | Saad ................ G06F 12/1408 |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 * | 10/2016 | Raizen ................ G06F 11/00 |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 * | 1/2017 | BenHanokh .......... G06F 3/0689 |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 * | 2/2017 | Natanzon ............ G06F 17/30575 |
| 9,575,851 B1 | 2/2017 | Natanzon et al. |
| 9,575,857 B1 | 2/2017 | Natanzon |
| 9,575,894 B1 * | 2/2017 | Natanzon ............ G06F 3/0647 |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 * | 3/2017 | Natanzon .......... G06F 17/30581 |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 * | 5/2017 | Natanzon ............ G06F 3/0647 |

(56) References Cited

U.S. PATENT DOCUMENTS

| | | |
|---|---|---|
| 9,710,177 B1 | 7/2017 | Natanzon |
| 9,720,618 B1 | 8/2017 | Panidis et al. |
| 9,722,788 B1 * | 8/2017 | Natanzon ................ H04L 9/0891 |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 * | 8/2017 | Natanzon ................. G06F 7/00 |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 * | 9/2017 | Natanzon ............... G06F 3/0608 |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 * | 11/2017 | Natanzon ............ G06F 11/1435 |
| 9,823,973 B1 | 11/2017 | Natanzon |
| 9,832,261 B2 | 11/2017 | Don et al. |
| 9,846,698 B1 * | 12/2017 | Panidis ............. G06F 17/30088 |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Lieberman et al. |
| 10,101,943 B1 * | 10/2018 | Ayzenberg ............ G06F 3/0656 |

* cited by examiner

RANSOMWARE DETECTION IN A CONTINUOUS DATA PROTECTION ENVIRONMENT

BACKGROUND

Computer data is vital to today's organizations and a significant part of protection against disasters is focused on data protection. Existing data protection systems may provide continuous data protection, meaning that every change made to data is backed up.

Ransomware attacks are increasing prevalent. In a typical attack, the attacker installs a virus on a victim host (e.g., a desktop or server computer) that replaces files on the host with encrypted versions of those files. If strong encryption is used, the original files can practically only be recovered using a secret key held by the attacker. The attacker may demand payment in exchange for the secret key.

SUMMARY

Described herein are embodiments of systems and methods for detecting and mitigating ransomware attacks in a continuous data protection environment.

According to one aspect of the disclosure, a method comprises: intercepting a write request from a host to storage, the write request comprising write data; calculating a probability of ransomware within the host; if the probability of ransomware is less than or equal to a first threshold, sending an acknowledgement (ACK); if the probability of ransomware is greater than a first threshold value and less than or equal to a second threshold value, creating a bookmark and sending an ACK; and if the probability of ransomware is greater than the second threshold value, sending a delayed ACK.

In various embodiments, the method further comprises determining a probability that the write data is actually encrypted; determining a probability that the write data is expected to be encrypted, wherein calculating the probability of ransomware includes calculating the probability of ransomware based upon the probability that the write data is actually encrypted and the probability that the write data is expected to be encrypted. In one embodiment, the method further comprises sending the write request to the storage after a splitter receives the ACK from a DPA. In certain embodiments, if the probability of ransomware is greater than the second threshold value, notifying a user of suspected ransomware. In one embodiment, determining a probability that the write data is actually encrypted comprises calculating an entropy of the write data.

In some embodiments, the method further comprises adding the write data to a list of recent write data, wherein determining a probability that the write data is actually encrypted comprises calculating an entropy over the list of recent write data. In certain embodiments, determining the probability that the write data is expected to be encrypted comprises determining a percentage of the storage that is encrypted. In one embodiment, the write request further comprises an offset within the storage, wherein determining the probability that the write data is expected to be encrypted comprises determining whether encrypted data was previously written to the offset within the storage. In various embodiments, determining the probability that the write data is expected to be encrypted comprises determining one or more applications running on the host.

According to another aspect of the disclosure, a system comprises one or more processors; a volatile memory; and a non-volatile memory storing computer program code that when executed on the processor causes execution across the one or more processors of a process operable to perform embodiments of the method described hereinabove.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
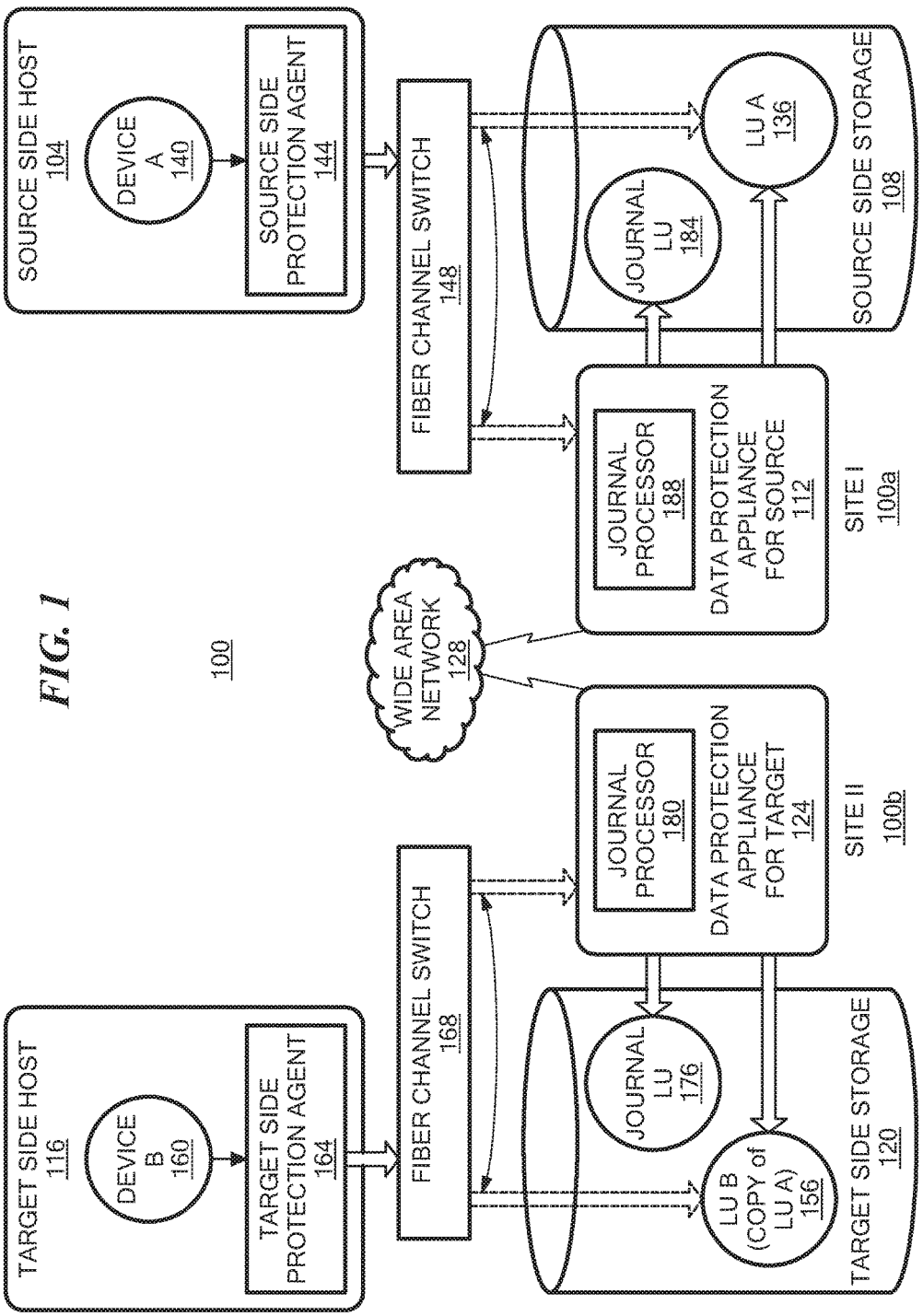
FIG. 1 is a block diagram of a data protection system, according to one embodiment of the disclosure.

Referring to the embodiment of FIG. 1, a data protection system 100 includes two sites: Site I 100a and Site II 100b. Under normal operation Site I 100a may correspond to a source side (i.e., the transmitter within a data replication workflow) of system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, storage systems may be SAN entities that provide multiple LUs for access by multiple SAN initiators. In many embodiments, an LU is a physical or virtual logical entity provided by a storage system for accessing data stored therein. In some embodiments, a LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access a LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. In other embodiments, a protection agent may be located in a fiber channel switch or in any other device situated in a data path between a host and a storage system or on the storage system itself In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." The journal may be used to provide access to storage at specified points in time, as discussed further below in conjunction with FIG. 2. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 is configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

In various embodiments, the source DPA 112 is configured to detect and mitigate the effects of ransomware within the source host 104. In some embodiments, the source DPA 112 uses techniques described below in conjunction with FIGS. 3 and 5 to detect and mitigate the effects of ransomware.

Figure 2:
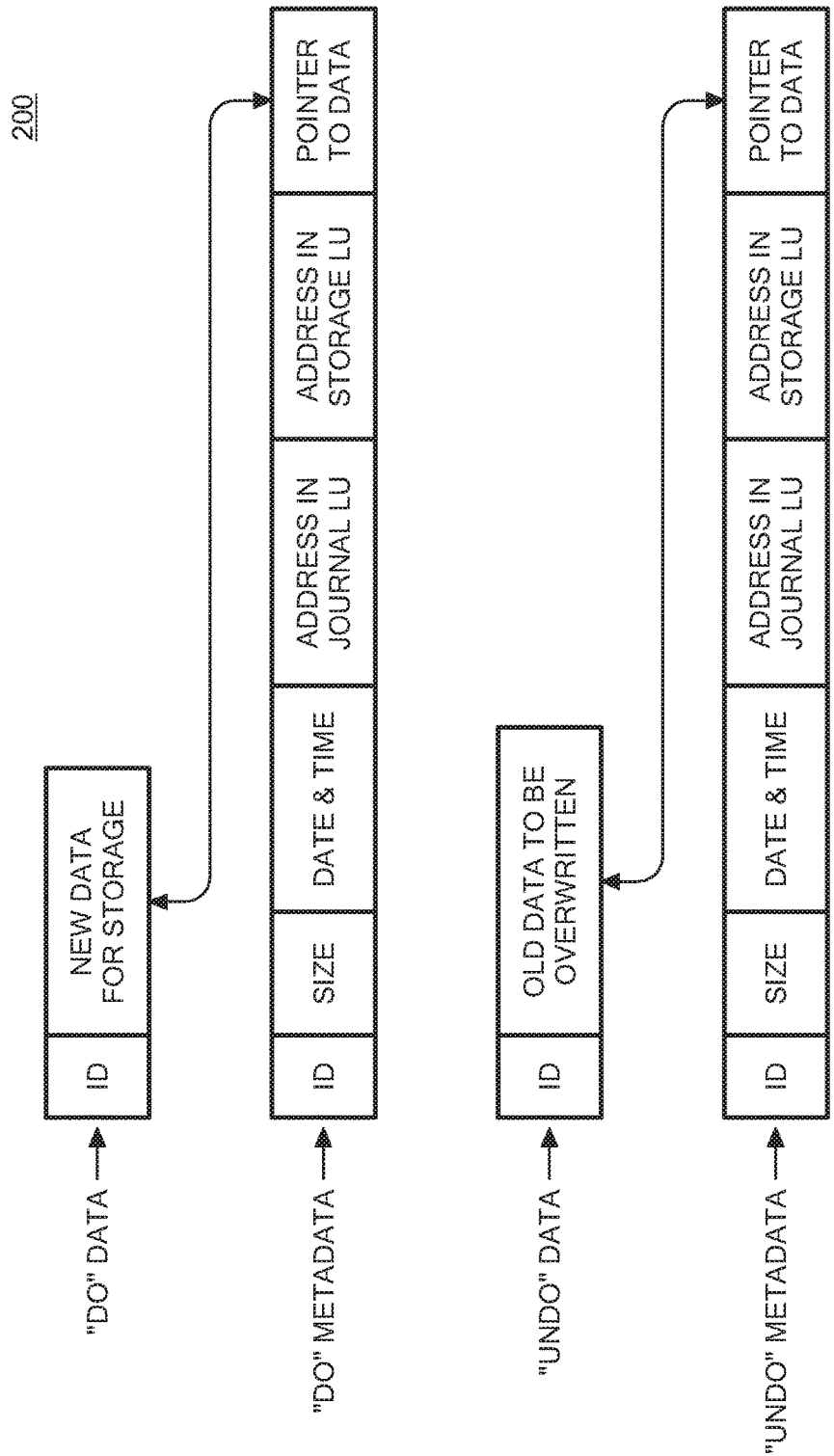
FIG. 2 is a diagram illustrating a journal history of write transactions for a storage system, according to one embodiment of the disclosure.

Referring to the embodiment of FIG. 2, a write transaction 200 may be included within a journal and stored within a journal LU, in accordance with an embodiment. The write transaction 200 includes one or more identifiers; a time stamp indicating the date and time at which the transaction was received by the source DPA; a write size indicating the size of the data block; a location in the journal LU where the data is entered; a location in the target LU where the data is to be written; and the data itself.

Referring briefly to both FIGS. 1 and 2, the transaction 200 may correspond to a transaction transmitted from the source DPA 112 to target DPA 124. The target DPA 124 may record the write transaction 200 in the journal that includes four streams. A first stream, referred to as a "DO" stream, includes a copy of the new data for writing to LU B 156. A second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. A third stream, referred to as an "UNDO" stream, includes a copy of the data being overwritten within LU B 156 (referred to herein as the "old" data). A fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, data that was stored in specific memory locations at a specified point in time may be obtained by undoing write transactions that occurred subsequent to such point in time.

Each of the four streams may hold a plurality of write transaction data. As write transactions are received dynamically by target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Figure 3:
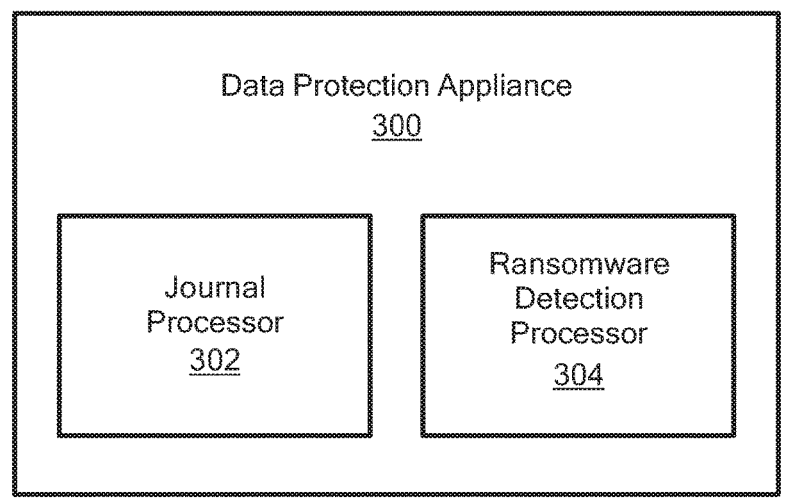
FIG. 3 is a block diagram of a data protection appliance, according to another embodiment of the disclosure.

Referring to FIG. 3, a data protection appliance (DPA) 300 includes a journal processor 302 and a ransomware detection processor 304, according to one embodiment. The DPA 300 may be the same as or similar to either DPA 112 or 124 in FIG. 1, and the journal processor may be the same as or similar to either journal processor 188 or 180 in FIG. 1.

As discussed above in conjunction with FIG. 1, a source host 104 may include a protection agent 144 to intercept I/O requests originating from the host 104 and to send them to a DPA. In some embodiments, the I/O requests may be write requests. After the DPA acknowledges the I/O request, the protection agent 144 sends the I/O request to the backend storage 108.

Thus, referring to FIG. 3, the DPA 300 can be leveraged for the detection of potential ransomware within a host by analyzing I/O requests received from that host (or from a protection agent/splitter associated therewith). Specifically, the DPA's ransomware detection processor 304 is configured to analyze data written by a host, to determine whether write data is encrypted (i.e., "actually" encrypted), and to calculate the probability that ransomware is running on the host based upon this and other factors. In one embodiment, the ransomware detection processor determines whether write data is encrypted using an entropy metric. In some embodiments, when processing an I/O write request, the ransomware detection processor looks at only data within that write to determine whether it is encrypted. In other embodiments, the ransomware detection processor keeps a history of recent write data and performs an encryption analysis over the recent history (e.g., by calculating the entropy of the last N write requests).

In various embodiments, the presence of encrypted write data is not necessarily an indicator of ransomware. For example, database applications and other applications running on a host may generate encrypted write data during normal operation. To account for this, in some embodiments the ransomware detection processor may use a priori information about encrypted data within storage to determine whether data written by the host is expected to be encrypted. In one embodiment, the ransomware detection processor may know the percentage of storage that is already encrypted (e.g., by tracking the percentage of encrypted writes over several hours, days, or weeks). In certain embodiments, the ransomware detection process may know which regions (e.g., chunks) within storage were previously encrypted. In some embodiments, the ransomware detection processor may know which applications are installed and/or running on the host, and whether those applications typically write encrypted data.

In some embodiments, the ransomware detection processor determines (1) a probability that data written by the host is actually encrypted and (2) a probability that data written by the host is expected to be encrypted. In certain embodiments, the ransomware detection processor calculates a ransomware probability using both these actual and expected probabilities.

Referring again to FIG. 3, if the ransomware probability exceeds one or more predetermined thresholds, then the DPA 300 may take actions to mitigate the effects of a potential ransomware attack. In some embodiments, the ransomware probability may be compared against both a first threshold value and a second threshold value (great than the first threshold value). If the ransomware probability exceeds the first threshold value, a first mitigation action may be taken. If the ransomware probability exceeds the second threshold value, a second mitigation action may be taken. In one embodiment, the lower threshold value is about 50% and the upper threshold value is about 75%.

In some embodiments, the first mitigation action includes creating a bookmark. In such embodiments, if a user confirms that the data was actually infected by ransomware, the user call rollback the state of storage to the point in time when the bookmark was created, thereby mitigating the impact of the ransomware attack. In some embodiments, creating a bookmark includes adding metadata to the journal associated with a given point in time.

In certain embodiments, the second mitigation action includes delaying host writes to the storage array. As discussed above in conjunction with FIG. 1, in some embodiments when a splitter receives a write from a host, it may send the write to a DPA, wait for an acknowledgement (ACK) from the DPA, and then send the write to the storage array after receiving the ACK. Thus, in some embodiments, the DPA can slow down writes to the storage array by delaying ACKs to the splitter, thereby reducing the number of files that may be affected by a suspected ransomware attack. In some embodiments, the second mitigation includes notifying a user of the suspected ransomware to determine whether an actual ransomware attack has occurred and, if so, whether to rollback to a bookmarked point in time.

Figure 4:
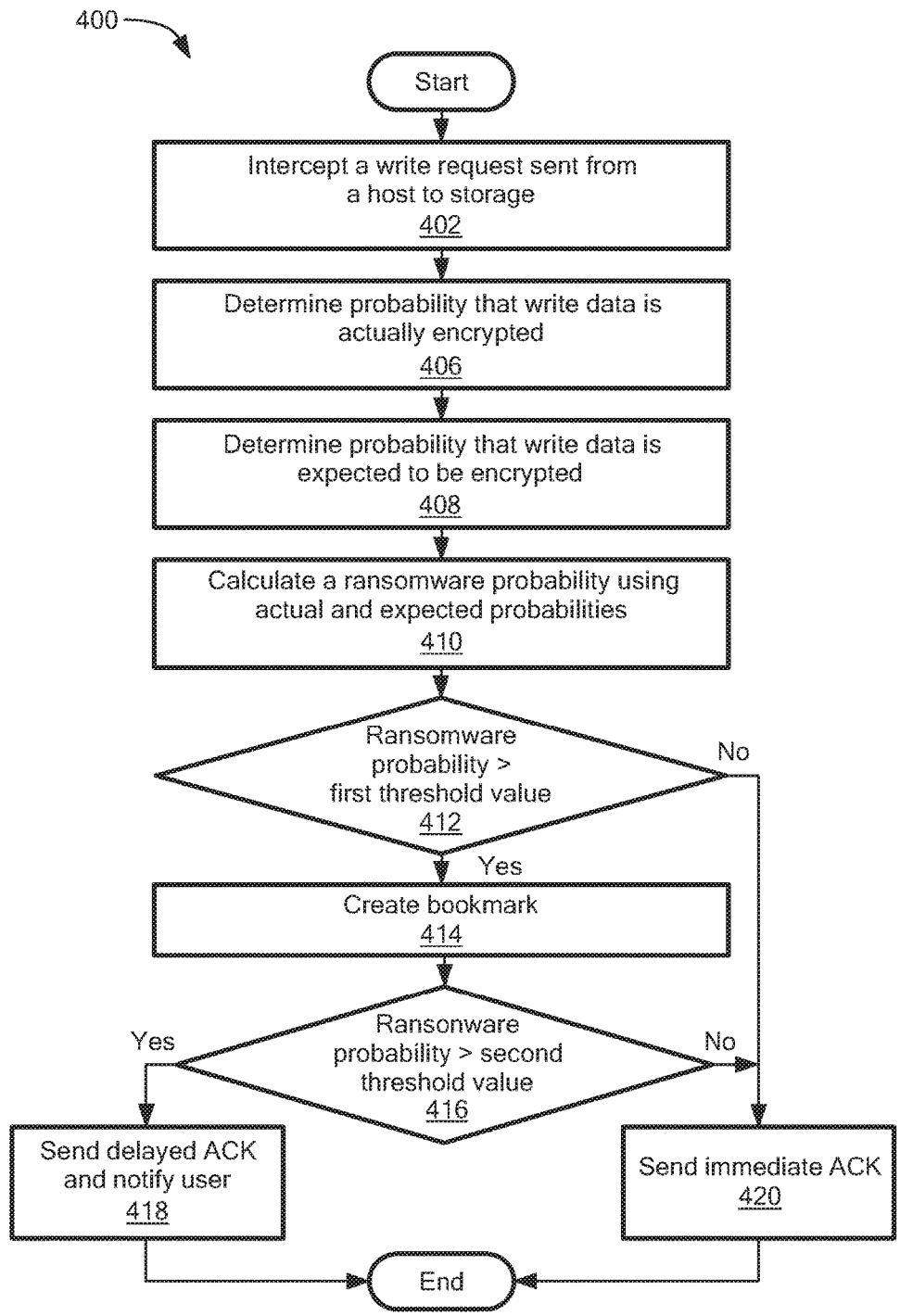
FIG. 4 is flow diagram of a method for detecting and mitigating ransomware attacks, according to embodiments of the disclosure.

FIG. 4 is a flow diagram showing illustrative processing that can be implemented within data protection system (e.g., data protection system 100 of FIG. 1). In some embodiments, at least a portion of the processing described herein may be implemented within a data protection appliance (e.g., DPA 300 of FIG. 3). In one embodiment, at least a portion of the processing described herein may be implemented within a ransomware detection processor (e.g., ransomware detection processor 304 of FIG. 3). Rectangular elements (typified by element 402), herein denoted "processing blocks," represent computer software instructions or groups of instructions. Diamond shaped elements (typified by element 406), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to FIG. 4, a method 400 can be used to detect and mitigate the effects of ransomware within a continuous data protection environment, according to an embodiment of the disclosure. At block 402, a write request from a host to storage is intercepted. In some embodiments, the write request is intercept at a splitter. In certain embodiments, the splitter sends the write request to a DPA, which performs at least some of processing described herein below.

Referring back to FIG. 4, at block 406, a probability that the write data is actually encrypted (the "actual probability") is determined. In some embodiments, this includes calculating the entropy of the write data. In certain embodiments, a list of recent write data is maintained and determining the probability that the write data is actually encrypted includes calculating entropy over the list of recent write data. In one embodiment, a prerequisite for performing ransomware detection is that there must be at least a minimum amount of recent write data available to analyze. Thus, in such embodiments, if a sufficient amount of write history is not available for the host, then the probability that the write data is actually encrypted is not determined or is determined to be zero. In other embodiments, the system may scan recently written data within storage in order to determine the probability that the write data is actually encrypted.

Referring back to FIG. 4, at block 408 a probability that the write data is expected to be encrypted (the "expected probability") is determined using a priori information about encrypted data within storage. In some embodiments, the expected probability is determined based on the percentage of storage that is already encrypted. In certain embodiments, the expected probability is determined based on whether the write request overwrites a portion of storage that is already encrypted. In particular embodiments, the expected probability is based on whether applications installed/running on the host typically write encrypted data.

Referring back to FIG. 4, at block 410, a ransomware probability is calculated using the probability that the write data is actually encrypted (from block 406) and the probability that the write data is expected to be encrypted (from block 408).

At block 412, if the ransomware probability is greater than a first threshold value, then a bookmark is created (block 414). At block 416, if the ransomware probability is greater than a second threshold value (greater than the first threshold value), then a delayed ACK may be sent (block 418), causing a delay in applying the write to storage. In some embodiments, a delayed ACK is sent from the DPA to the splitter, causing the splitter to delay the write to storage. In some embodiments, once the ransomware probability exceeds the second threshold value, then the DPA may begin delaying ACKs for subsequent writes (e.g., all subsequent writes until such time as a lower ransomware probability determined). In the embodiment of FIG. 4, a user may be notified of suspected ransomware if the ransomware probability is greater than the second threshold value (block 418). If the ransomware probability is less than or equal to the first threshold, then an immediate ACK may be sent, causing the write to be applied to storage without delay (block 420). In some embodiments, the immediate ACK is sent from the DPA to the splitter. In one embodiment, the first threshold value is about 50% and the second threshold value is about 75%.

In certain embodiments, blocks 406-420 may be performed by a DPA.

Figure 5:
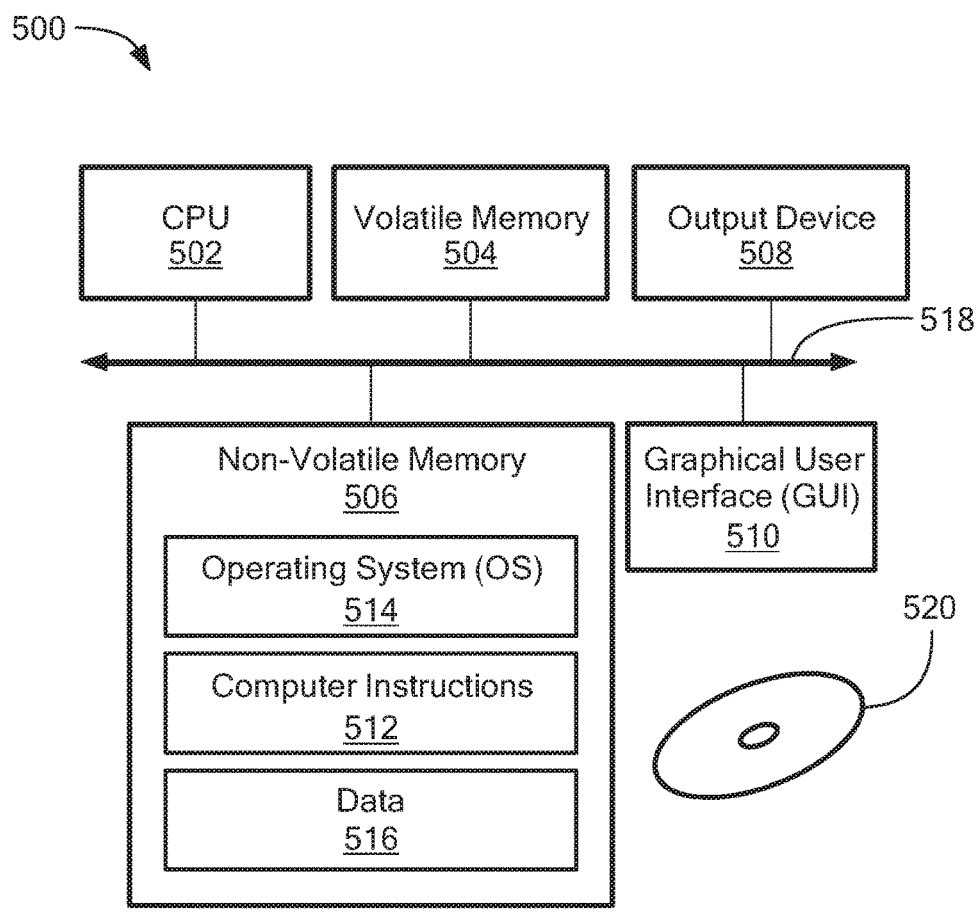
FIG. 5 is a block diagram of a computer on which the method of FIG. 4 may be implemented, according to an embodiment of the disclosure.

FIG. 5 shows a computer 500 that can perform at least part of the processing described herein, according to one embodiment. The computer 500 may include a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 may be configured to store computer instructions 512, an operating system 514, and data 516. In one example, the computer instructions 512 are executed by the processor 502 out of volatile memory 504. In one embodiment, an article 520 comprises non-transitory computer-readable instructions. In some embodiments, the computer 500 corresponds to a virtual machine (VM). In other embodiments, the computer 500 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for use in a storage system comprising:
   intercepting a write request from a host to the storage system, the write request comprising write data;
   adding the write data to a list of recent write data and determining a probability that the write data is actually encrypted by calculating an entropy over the list of recent write data;
   calculating a probability of ransomware within the host based upon the probability that the write data is actually encrypted;
   if the probability of ransomware is less than or equal to a first threshold, sending an acknowledgement (ACK) without delay from the storage system to the host;
   if the probability of ransomware is greater than a first threshold value and less than or equal to a second threshold value, creating a bookmark that is associated with a point in time corresponding to the data, storing the bookmark in the storage system, and sending an ACK without delay from the storage system to the host; and
   if the probability of ransomware is greater than the second threshold value, sending a delayed ACK from the storage system to the host.

2. The method of claim 1 wherein intercepting the write request from a host to storage comprises intercepting the write request at a splitter, the method further comprising:
   sending the write request from the splitter to a data protection appliance (DPA), wherein sending an acknowledgement (ACK) comprises sending an acknowledgement (ACK) from the DPA to the splitter.

3. The method of claim 2 further comprising:
   sending the write request to the storage after the splitter receives an ACK from the DPA.

4. The method of claim 1 further comprising:
   if the probability of ransomware is greater than the second threshold value, notifying a user of suspected ransomware.

5. The method of claim 1 wherein determining a probability that the write data is actually encrypted comprises calculating an entropy of the write data.

6. The method of claim 1 wherein determining the probability that the write data is expected to be encrypted comprises determining a percentage of the storage that is encrypted.

7. The method of claim 1 wherein the write request further comprises an offset within the storage, wherein determining the probability that the write data is expected to be encrypted comprises determining whether encrypted data was previously written to the offset within the storage.

8. The method of claim 1 wherein determining the probability that the write data is expected to be encrypted comprises determining one or more applications running on the host.

9. A system comprising:
   one or more processors;
   a volatile memory; and
   a non-volatile memory storing computer program code that when executed on the processor causes execution across the one or more processors of a process operable to perform the operations of:
      intercepting a write request from a host to a storage system, the write request comprising write data;
      adding the write data to a list of recent write data and determining a probability that the write data is actually encrypted by calculating an entropy over the list of recent write data;
      calculating a probability of ransomware within the host based upon the probability that the write data is actually encrypted;
      if the probability of ransomware is less than or equal to a first threshold, sending to an acknowledgement (ACK) to the host;
      if the probability of ransomware is greater than a first threshold value and less than or equal to a second threshold value, creating a bookmark that is associated with a point in time corresponding to the data, storing the bookmark in the storage system, and sending an ACK to the host; and
      if the probability of ransomware is greater than the second threshold value, sending a delayed ACK to the host.

10. The system of claim 9 wherein the computer program code causes execution of a process further operable to perform the operations of:
    if the probability of ransomware is greater than the second threshold value, notifying a user of suspected ransomware.

11. The system of claim 9 wherein determining a probability that the write data is actually encrypted comprises calculating an entropy of the write data.

12. The system of claim 9 wherein determining the probability that the write data is expected to be encrypted comprises determining a percentage of the storage that is encrypted.

13. The system of claim 9 wherein the write request further comprises an offset within the storage, wherein determining the probability that the write data is expected to be encrypted comprises determining whether encrypted data was previously written to the offset within the storage.

14. The system of claim 9 wherein determining the probability that the write data is expected to be encrypted comprises determining one or more applications running on the host.

15. A computer program product tangibly embodied in a non-transitory computer-readable medium, the computer-readable medium storing program instructions that are executable to:
- intercept a write request from a host to a storage system, the write request comprising write data;
- add the write data to a list of recent write data and determining a probability that the write data is actually encrypted by calculating an entropy over the list of recent write data;
- calculate a probability of ransomware within the host based upon the probability that the write data is actually encrypted;
- if the probability of ransomware is less than or equal to a first threshold, send an acknowledgement (ACK) to the host;
- if the probability of ransomware is greater than a first threshold value and less than or equal to a second threshold value, create a bookmark that is associated with a point in time corresponding to the data, storing the bookmark in the storage system, and sending an ACK to the host; and
- if the probability of ransomware is greater than the second threshold value, send a delayed ACK to the host.

\* \* \* \* \*